C. L. A. BRASSEUR.
COLOR PHOTOGRAPHY.
APPLICATION FILED FEB. 28, 1907.
1,163,207.
Patented Dec. 7, 1915.
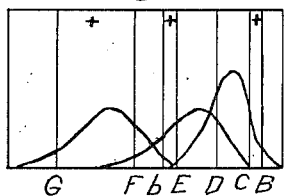
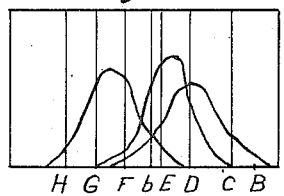
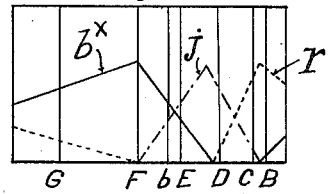
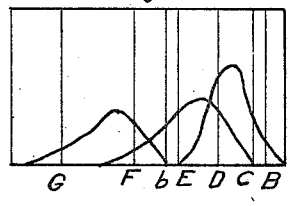
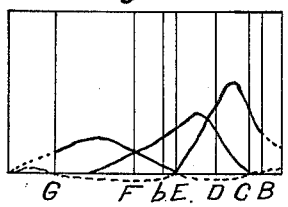
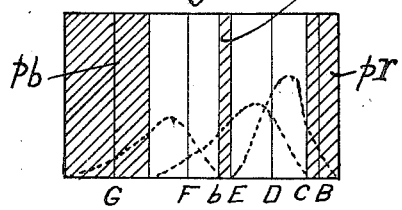
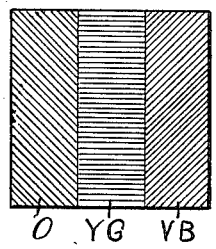
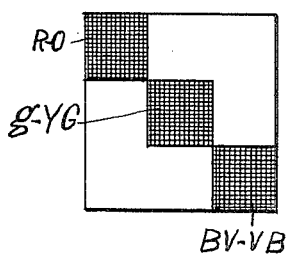
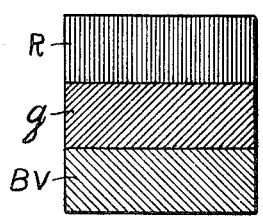

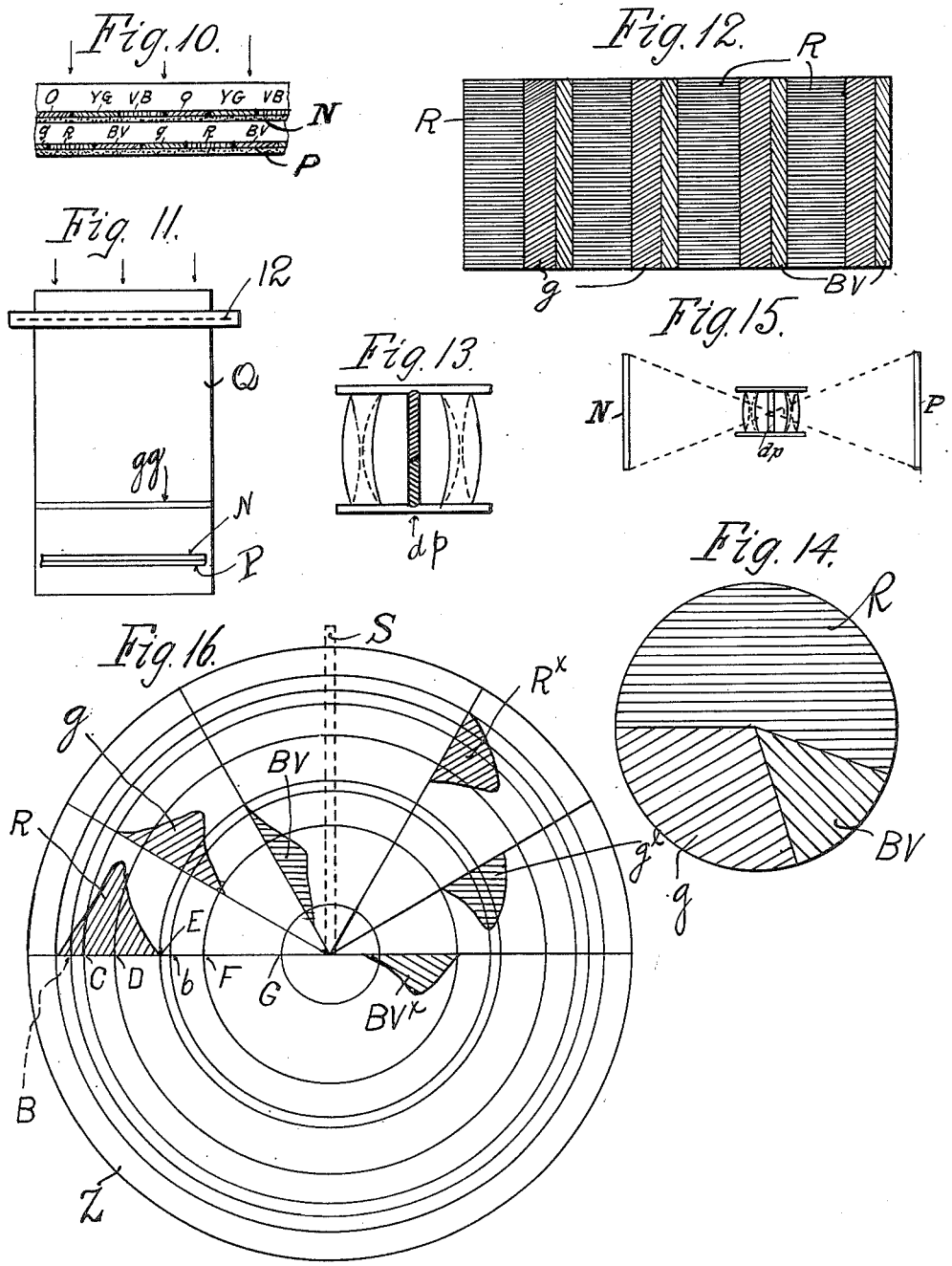

UNITED STATES PATENT OFFICE.

CHARLES L. A. BRASSEUR, OF NEW YORK, N. Y.

COLOR PHOTOGRAPHY.

1,163,207.  Specification of Letters Patent.  Patented Dec. 7, 1915.

Application filed February 28, 1907. Serial No. 359,895.

*To all whom it may concern:*

Be it known that I, CHARLES L. A. BRASSEUR, a citizen of the United States, and a resident of New York city, in the county of New York and State of New York, have invented a certain new and useful Improvement in Color Photography, of which the following is a specification.

This invention relates to a method of producing photographs in natural colors or colors seeming such to the eye.

The use of a parti-colored or polychrome ruled screens to obtain color-photographs by one exposure offers some undesirable features, one of which is the difficulty of registering the viewing screen with the positive image in order to obtain correct colors; another difficulty is the change of colors of the photograph due to the effects of parallax, which latter can only be remedied by the use of the best and consequently costliest quality of plate glass. The use of grained polychrome screens, that is, screens formed of colored grains or of juxtaposed blocks of celluloid stained in the three selected colors, and on which screens the gelatin bromid emulsion, out of which is to be formed the photographic image, is coated directly, enables one to surmount the aforesaid undesirable features. But the use of these grained screens introduces certain other objectionable features which the ruled screens do not offer, among which objectionable features are the following: Such grained screens necessitate the use of very fine grained photographic emulsions, which emulsions are slow and require a long exposure; moreover, it is necessary to make as many exposures (negatives) as are wanted copies, for, notwithstanding assertions to the contrary, the methods thus far published do not allow duplicating from the original negative; it is difficult to control the relations which must exist between the sensitiveness of the emulsion and the colors of the screen, as there can be no comparison bands to guide the operator; the use of one and the same screen for taking the photograph and for viewing that same photograph, an unavoidable fact in this method, necessarily falsifies certain colors; finally, a screen is wasted with every photograph wrongly timed or developed. Those who have had experience know that while there is a certain latitude in the exposure of the negative, the same does not hold true for the positive, the slightest error either in exposure or in development giving positives unfit for use because untrue as to color. On the other hand, ruled or patterned screens offer the following advantages: The ruled screen is never wasted, for the one screen can be used to take an unlimited number of negatives (that is, in the photographic analysis); moreover, the ruled screen enables one to make very short exposures, as the lines, while indistinguishable to the naked eye when less than a given width, are still broad enough (in my own make, the one five-hundred-and-twenty-fifth of an inch in width) to admit of the use of dry plates coated with fairly coarse grained emulsions, such as are used in ordinary photographic work; also, one is enabled to obtain readily black and white copies from the original negatives (which are uncolored) and by a new method (see German Patent No. 177,243) these copies can be made absolutely orthochromatic; the ruled screen also enables one to obtain from one original negative an unlimited number of color-positives; its use in conjunction with the comparison bands mentioned above and the compensating screens mentioned in my pending application for Letters Patent of the United States filed May 29, 1906, Serial Number 319,269, enables one to ascertain readily the relation between the colors of the screen and the color-sensitiveness of the plate and to make the corrections which may be necessitated, either by changes in the sensitiveness of the emulsion or by changes in the atmospheric conditions; finally, the use of the ruled screens enables one to obtain color-prints on paper (United States Letters Patent dated November 12, 1896, numbered 571,314) and admits of the plate-maker and printer rapidly comparing and judging the values of the different plates which they must use to obtain color prints. Against all these advantages of the ruled screen must be charged the fact that its use entails, before color can be obtained (that is, the optical synthesis), the supplementary operations of placing the screen in contact with the image, of carefully registering the two and of sealing them, and, that to see the colors correctly, the positive must be held in a plane normal to the visual axis, else errors of color due to the effects of parallax will result.

The object of the present invention is to combine as far as may be the advantages of the two processes above discussed and to reduce their respective disadvantages to a minimum.

The present invention enables one, on the one hand, to produce colored diapositives from a colored-grain negative or from a line-negative (or other negative in regularly recurring patterns), and, on the other hand, to obtain colored-grain positives from a line-negative or negative in other regularly recurring pattern.

It will, perhaps, promote a better understanding of the new method by first indicating the theoretical basis for it.

The processes in which use is made of the grained-polychrome screen vary somewhat from the classical process in that use is made of one and the same screen to take the negative and to view the positive, this being unavoidable since the emulsion is necessarily coated upon the screen itself and not upon a separate plate. By "classical process" is meant that process wherein the negatives are made according to the well-defined and measured (color-mixture) curves as adopted by Ives, Joly, Abney and myself, in which process the fundamental colors are recognized as being red, green and blue-violet. In the processes using the ruled or patterned screens, two different screens are used, a taking or negative screen for taking the negative photograph (the photographic analysis), and a viewing screen for viewing the positive (the optical synthesis). This is rendered possible by the fact that both the negative and the positive plates are independent of their respective screens. When use is made of one and the same screen for both taking and viewing the photograph, it is evident that the colors chosen for that screen must necessarily be a compromise between those usually chosen when two different screens are used, and it follows that the colors of a grained-screen are intermediate between the colors of the classical taking and viewing screens. The colors of these grained screens being somewhat ill-defined, the problem can best be considered from a study of the colors used in the ruled-screen process, as the solution of the problem applies equally well to both grained and ruled screen methods, and the theory of the ruled screen process in which color formation depends on the addition of light is now fairly well established.

The accompanying drawings illustrate in diagrammatic manner several methods which have been recommended, and also the new method forming the subject-matter of this application.

In the accompanying drawings, forming part hereof, Figure 1 represents Abney's color-mixture curves; Fig. 2 represents Abney's color-sensation curves; Fig. 3 represents the curves of du Hauron, as drawn from Chevreul's tables; Fig. 4 represents the color-mixture curves as modified for the present process; Fig. 5 represents Maxwell's (color-mixture) curves; Fig. 6 is a diagrammatic view showing, by the shaded portions thereof, the colors transmitted by color-filters used in the present process; Figs. 7 and 8 represent an arrangement of negative and positive color bands in a form convenient for the determination of correct exposure times; Fig. 9 represents the appearance of a correctly timed positive plate after exposure through the two last-mentioned screens; Fig. 10 represents a transverse section of a colored grain negative in contact with a colored grain positive film, ready for printing; Fig. 11 shows the general arrangement of a color positive printing outfit; Fig. 12 is a view, on an enlarged scale, of a tri-color screen used in conjunction with the outfit shown in Fig. 11; Fig. 13 shows a section of the lens with a tri-color screen in close contact with the diaphragm of the lens or at the plane of the diaphragm itself; Fig. 14 represents details of the screen used in the lens to obtain a color photograph in one exposure; Fig. 15 shows a copying camera as arranged to duplicate color photographs; Fig. 16 represents ($a$) at the left and ($b$) at the right opaque disks with colors on them which are used in verifying results.

The color mixture curves of Abney (Fig. 1) are those most generally used in the additive methods, these curves being derived from the Abney sensation curves (Fig. 2). The fundamental colors, by the mixture of which in proportions represented by the ordinates of the curves in Fig. 1, all the colors of the spectrum are matched, are indicated by the cross or plus-sign marks on Fig. 1. It will be understood that Figs. 1 to 5 inclusive represent the spectrum, and that the letters at the bottoms of those figures represent the well-known Fraunhofer lines. In Fig. 3, the reference characters $r$, $j$ and $b^x$ represent the curves, red, yellow and blue, of du Hauron's French patent of 1868, as deduced from Chevruel's tables, upon which du Hauron based his theory. The fundamental colors are those used in the viewing screens, and are red, green, and blue-violet, corresponding to the following wavelengths: red, 6700 microns; green, 5200 microns; blue-violet, 4600 microns. The classical negative may be described, therefore, as one taken through a party-colored or polychrome screen, ruled or grained, whose curves of transmission are such that the three deposits of silver formed when photographing the spectrum of white light, correspond to the color-mixture curves of Abney (Fig. 1.) It must be noted, however, that in all colored-grain processes the negatives are always colored, the emulsion being coated directly on the screen, while in the line processes, the negative may be obtained with or without color, according to the method employed. Were the grains themselves of regular outline and were they arranged in regularly recurring patterns, the first statement above would not necessarily be true. It will be understood, of course, that the grained-screen may be made in the "taking" colors, so that, in a photograph of the spectrum, the silver deposits may be in accordance with color mixture and theory, in which case the negative is classical as above defined. The problem is, therefore, to obtain diapositives in natural colors, or colors seeming such to the eye, from colored-grain negatives. (The distribution of the grains is at hazard, on such a screen.) Concerning the colored-grain process, it has been said, "that a negative in complementary colors being obtained, one conceives that, by contact with plates similarly prepared, positive prints may be made which will be complementary to the negatives, that is to say, will reproduce the colors of the original." Since the distribution of the grains is at hazard, it does not appear to be conceivable that all the red particles, for instance, will, on the second screen, lie directly over the reddish-orange particles of the first screen, notwithstanding the above-quoted statement. Thus, a red particle may lie astraddle of particles of different colors, as indicated in Fig. 10, with the result that red light might appear where only green and blue are wanted. The reason is not far to seek, as examination of the curves of Abney, Fig. 1 (A. D. 1903), Maxwell, Fig. 5 (A. D. 1861), and du Hauron, Fig. 3 (A. D. 1868) shows that, except at those points indicated by them as being primary (fundamental) colors, all these curves overlap one another, two by two, in all other parts of the spectrum. This, of course, is absolutely logical, since the fundamental colors are those which cannot be obtained by mixture of any other colors, while all others may be simulated exactly by mixture of the fundamental colors or two of them. It follows that the light transmitted through a reddish-orange particle of the grained-screen negative will affect, not merely the silver-bromid which is under the particle of corresponding color (red) on the positive plate but also, the silver-bromid under the green particle on the positive plate, for the reddish-orange transmits not only red and reddish-orange rays, but also yellowish-orange, yellow, and greenish-yellow rays. But these latter are also transmitted by the green particles (see Abney curve, Fig. 1,) and will, in consequence, affect the silver-bromid under the green particles as well as that under the orange. The same course of reasoning is applicable to the colors transmitted by the green particles and by the blue particles. Wherefore, the colors of the positive will be false to the original. Nor will the case be helped by choosing for the colors of the positive or viewing screen a red which will transmit only the red rays, a green which will transmit only green rays, and a blue-violet which will transmit only blue-violet rays, since such a screen is so dark as to have no practical value, for experience has shown that the colors of a polychrome viewing screen must be considerably lighter than those used in the three lantern or chromoscope process. In this connection, it must be noted that the luminosity of the best viewing or positive screen cannot be greater than one-third that of the incident light, the white, in such case, being due to the light transmitted through three juxtaposed lines or particles. Brilliancy of the image can only be obtained by reducing the saturation of the three different colors to the minimum compatible with the maintenance of the several hues, which must correspond to the three fundamental sensations.

In the foregoing discussion, white light has been used or assumed, for that is what has been used or proposed to be used. According to the present invention, instead of using white light, or light containing all the rays of the spectrum, a light containing rays of practically but three different wave-lengths is used; one wave-length corresponding to the pure red of the spectrum, about 6700 microns; another corresponding to the pure green, about 5200 microns; and the third corresponding to the blue-violet, or about 4600 microns. For a laboratory experiment, a sufficiently large patch of light, composed of three monochromatic beams, can be obtained by interposing three slits in the spectrum at the wave-lengths indicated above, and, by means of proper lenses, spreading out the lights to cover the same surface required. Now, if we expose to this (white) light a printing frame containing the colored-grain negative in contact with a colored-grain positive film, it is clear that, as the red rays of the wave-length indicated are common only to the reddish-orange and to the red grains, and are not transmitted by the green or the blue-violet grains, only the silver-bromid under the red grains can be affected; that, as the green rays of the wave-length indicated are common only to the yellow-green and to the green particles and are not transmissible by the red or the blue-violet particles, the silver-bromid under the green grains can be affected by the green rays only; and the like is true for the blue-violet rays, and the violet-blue and the blue-violet particles. Since the red and the blue mixture curves meet at the green (see Fig. 1), purity of the green, with resulting slight errors toward the blue and the yellow, may be secured by cutting down the transmission by the reddish-orange and the violet-blue particles (on lines) as indicated by the right and left-hand curves in Fig. 4 of the drawing. The error introduced by this departure from the theoretical requirements is very much less than that resulting from the use of the same screen for both taking and viewing the photograph. That is, the rays transmitted by the reddish-orange of the taking screen stop at about the E line of the spectrum, and the rays transmitted by the blue of the taking screen stop at about the b-line of the spectrum, with slight diminutions in the intensities of the silver deposits near those lines.

For practical use, one must use monochromatic glass screens in place of the spectral light, one screen to transmit only red rays, that is, the region beyond the orange of the spectrum toward the red end; the green screen, the hardest to obtain, will transmit a narrow band of green comprised between the E and the b-lines of the spectrum; the blue-violet, only the rays forming the blue-violet and the violet. Such screens are very deep in color, but, for copying purposes, the resulting long exposures are unobjectionable. The red transmitted by a screen of this character is indicated in Fig. 6 by the reference $pr$, the green, by the reference $pg$, and the violet by the reference $pb$. These screens will be described more particularly at a later stage herein.

In order to determine the efficacy of the screens last-mentioned when used in making colored diapositives from a colored-grain negative, and the relative exposure times required to obtain correct exposures for the different images, one may proceed as follows: Prepare two screens as indicated in Figs. 7 and 8; on one are three bands, O, the orange; YG, the yellow-green, and VB, the violet-blue, to wit: the three negative or taking colors, and on the other, three broad horizontal bands, R, $g$ and BV, of the positive or viewing colors respectively the pure red, the pure green and pure blue violet, or fundamental colors. Place the positive screen in contact with the negative screen with their bands crossing each other, and behind the whole place a dry plate coated with the desired panchromatic emulsion, it is but necessary to expose the whole successively to the light coming through each of said monochromatic screens. The relative exposures will be correct and the monochromatic screens will have the requisite qualities when the photograph thus obtained presents the appearance indicated in Fig. 9; that is, three squares of silver deposit absolutely equal in intensity, and no deposit whatsoever on the other parts of the plate. If such deposit should occur, the monochromatic screens must be corrected. The square R—O will be formed where the light is transmitted through the band O and the band R, the square $g$—YG will be formed where the bands YG and $g$ cross, and the square BV—VB will be formed by light transmitted by the crossed bands VB and BV. If, therefore, a positive grained film is exposed behind a colored-grain negative in succession to light transmitted by such monochromatic glass screens, a diapositive in natural colors or in colors seeming such to the eye will be obtained.

In order to avoid three successive exposures behind the described screens, one may employ a screen in three colors, R, $g$ and BV (see Fig. 12), arranged in juxtaposed lines, or in patterned form, the sums of the surfaces of the different colors being proportional respectively to the respective exposure times of the different colors; thus, if the red requires twelve seconds exposure, the green six seconds exposure, and the blue-violet, three seconds exposure, the widths of the bands of color, R, $g$ and BV, would be as four, two and one. By placing the colored negative, N, and the positive film, P, at the bottom of a deep box Q, and the screen of Fig. 12 at the point 12 (Fig. 11), and exposing to light, moving the screen at 12 back and forth in a direction transverse to the lines thereof the while, the colored positive may be formed, and the different monochromatic lights will be sufficiently blended; by placing a ground glass $gg$ between the screen at 12 and the negative, the blending is facilitated. In this operation, the pure red light falling on the areas O of the negative N may or may not be transmitted to the positive P, according to the nature of the silver deposit or the lack of it behind such areas O on the negative; the pure red light which is transmitted to the positive P will penetrate the red areas R, but no others, on the positive screen on which it falls and will cause a deposit of silver behind such red areas as it may strike; in similar fashion, the pure green light falling on the areas YG of the negative N may or may not be transmitted to the positive, but such pure green light as may be transmitted will penetrate such green areas $g$ as it may strike on the positive and will cause silver to be deposited behind them; and in like fashion, the pure blue-violet light falling on the negative screen may or may not be transmitted by the areas VB thereof to the positive, but such pure blue-violet light as is transmitted to the positive will penetrate such areas VB thereof as it may fall upon and thus cause silver to be deposited behind them. That is to say, the pure red passes only through the pure red areas of the positive screen and through the orange areas of the negative screen, the pure green light passes only through the pure green areas of the positive screen and through the yellowish-green areas of the negative screen, and the pure blue-violet light passes only through the pure blue-violet areas of the positive screen and through the violet-blue areas of the negative screen. By pure red, green, and blue-violet lights, I mean such as are predominantly such to the eye, and not that they are the very narrow spectrum bands taken as the fundamental colors; that is, the pure red is predominantly the fundamental red, the pure green is predominantly the fundamental green, and the pure blue-violet is predominantly the fundamental blue-violet.

If one wishes to use the copying camera in obtaining the colored diapositives (Fig. 15), correct timing of the three different images, at one exposure, can be obtained by inserting in the lens and in close proximity to or in the diaphragm plane itself ($dp$, in Fig. 13), a screen divided into sectors of the necessary colors, R, $g$, BV, which sectors are proportional in area to the respective times of exposure required (see Fig. 14). In case colored-grain images are being copied in the camera, it is probable that the slight lack of sharpness of the image, which must be resorted to, to cause the necessary diffusion of the light and which is absolutely inappreciable by the eye, will be sufficient to insure one necessary condition, namely, that all the colored-grains of each color on the positive be affected by the light coming through the corresponding colored grains on the negative. But in case line-negatives are to be copied, it will be necessary to displace the negative or the positive the width of three lines to make sure that each series of three lines affect the corresponding series on the positive plate. (See Patent No. 571,314.) But, when copying grain negatives (not those in which the colors are juxtaposed blocks of celluloid), it is necessary to give a slight displacement to one plate or the other in order to avoid having transparent spaces on the positives, which spaces would correspond to the black intervals on the negative. Line-negatives, made on plates independent of the screen, can be copied directly by first placing upon them a pure color screen, ruled in colors having the respective densities required to insure unity of exposure. Screens with such intense colors are hard to make, and it is better to use ordinary line-negative screen in conjunction with pure-color trichromatic screens such as are illustrated in Figs. 12 and 14.

It is evident that the principles underlying the above-described methods can be applied equally well to the making of color prints upon paper. All that is necessary is to back a color-positive of suitable density with white paper and, after drying, remove it, if necessary, from its provisional support. It is essential that steps be taken to insure absolute adhesion between the colored grains or lines and the underlying photographic image, as any shifting of the one relatively to the others, would falsify the colors. These paper prints are not brilliant in color, but the blending of the colors is so perfect that, in some cases, this method can be satisfactorily applied. Pure color screens can also be employed in conjunction with color positives to obtain negatives from which plates can be made for three and four color printing. As in the Sampolo - Brasseur process (Patent No. 571,314), each partial image of the positive must be made to occupy the entire surface of the corresponding negative to insure the superposition of the subtractive colors in the final print.

The new method of analysis differs radically from those hitherto known, for, as before noted, all other color curves have overlapping parts, two by two, whereas the distinguishing feature of the present invention is non-overlapping transmission of the rays of the spectrum, whence it follows that the screens employed are absolutely unfitted for the photographic analysis required in present methods of color photography. This may be proved conclusively by photographing the solar spectrum, a feat which one must be able to accomplish with any true method of color photography, and reproduce the same faithfully or accurately.

Another manner of demonstrating the necessity of the overlapping of the curves (that is, the silver deposits in the three negatives of the spectrum) is the following: Take an opaque disk Z of card board or similar material; on this draw concentric circles B, C, D, E, $b$, F, G, (Fig 16) to represent the Fraunhofer lines of the spectrum at their relative distances apart, and along radii draw the color mixture curves of Abney; cut out these areas and cover the openings with colored films stained with the fundamental red (R), the fundamental green ($g$) and the fundamental violet (BV). Rotate the disk rapidly and view it through a slit S by transmitted light, or light transmitted through the areas R, $g$ and BV, and the spectrum will be faithfully simulated. Not only do we get the fundamental colors, but we also get the intermediate colors, the orange, yellow, yellow-green, blue, etc., in their respective hues and luminosities.

The synthesis being correct, the analysis must be. If, instead of the disk made as just described, we prepare a disk Z with colors in which the curves merely touch but do not overlap, see $R^x$, $g^x$, $BV^x$ in Fig. 16, and cause this disk to rotate rapidly and view it through a slit S Z or the like and by transmitted light, we obtain merely three bands of the primary colors used, in varying intensities. The foregoing demonstrates that, to obtain correct analyses of the colors, in taking the negatives, the curves of transmission of the light-filters or sifters must overlap.

It may be well to note at this point that instances will be found wherein authors recommend the use of pure red, pure green, and pure blue screens of light-filters for the analysis. It will be found, however, that invariably either the colors indicated cannot fulfil the conditions which they are called upon to fill, or that the authors erroneously assume that the spectrum is made up of three spectra (as in the old red, yellow and blue theory), or that they are using a false nomenclature of colors.

In the present invention, one does not analyze the colors of nature (except in taking the negatives according to the curves shown in Fig. 4), but makes an analysis of an analysis, the means for which are indicated above and herein. Thus, I may, instead of the three monochrome screens above spoken of and instead of the bands shown in Fig. 12, use a single monochrome screen of such light-selective absorption properties as will secure transmissions only in the regions of the spectrum indicated by the shaded portions of Fig. 6.

It will be noted that, in taking photographs of the spectrum according to the requirements of the curves shown in Fig. 4, two negatives are secured, one of which is formed by the action of all the spectrum rays between the extreme red-end of the spectrum and the Fraunhofer line E, with the greatest photographic action in the orange region of the spectrum, and the other of which is formed by the action of rays between the violet-end of the spectrum and Fraunhofer line b, with the greatest photographic action in the blue region of the spectrum, while the third negative is, or may be, as heretofore made.

The single monochrome screen spoken of above may be made by sealing together with Canada-balsam, two gelatinized glass plates, one of them stained with a color absorbing that part of the spectrum which lies between the pure red and the pure green, and the other absorbing that part of the spectrum which lies between the pure green and the pure blue-violet. Generally, a supplementary compensating screen must be used with this single screen, the function of the compensating screen being to reduce the different exposures of the three colors to a given unit of time. I also remark that the filters transmitting the pure red, the pure green, and the pure blue-violet rays may be placed in front of the lens, as well as in the diaphragm plane thereof.

What I claim as new and desire to secure by Letters Patent of the United States is—

1. The method, substantially as heretofore set forth, of producing a colored positive photograph on a base made up of minute areas each of a single color and all ranging through only a predetermined number of colors, and from a negative the base whereof comprises similar minute monochromatic areas ranging through a like number of colors, such method consisting in printing said positive by light passed through both bases and which includes rays only of the same number of colors as those of each base, the colors of the light rays being so related to those of the bases that the light rays of each color will be ineffective except beneath those portions of one color only of the positive that are superposed by portions of a corresponding single color of the negative, these receptive colors for the bases being each different for the different light colors.

2. The method, substantially as heretofore set forth of producing colored positive photographs on a plate, film or paper formed of red, green and blue-violet lines, grains or areas from a negative photograph formed of orange, yellowish-green and violet-blue areas consisting in printing by means of only pure red light, pure green light, and pure blue-violet light.

3. The method, substantially as heretofore set forth of producing colored positive photographs on a plate, film or paper formed of red, green and blue-violet lines, grains or areas from a negative photograph formed of orange, yellowish-green and violet-blue areas consisting in printing said positive by means of three different groups of light rays, one of which groups contains only rays which will pass through the orange areas of the negative and the red areas of the positive plate, film or paper, another group of which contains only rays which will pass through the yellowish-green areas of the negative and the green areas of the positive plate, film or paper, and another group of which contains only rays which will pass through the violet-blue areas of the negative and the blue-violet areas of the positive.

Signed at New York in the county of New York and State of New York this 27 day of February A. D. 1907.

CHARLES L. A. BRASSEUR.

Witnesses:
A. T. STOUTENBURGH,
R. W. BARKLEY.